United States Patent [19]

Griesinger

[11] Patent Number: 4,872,694
[45] Date of Patent: Oct. 10, 1989

[54] TRUCK TIRE MOUNTING DEVICE

[75] Inventor: William B. Griesinger, Rte. 1, Box 76, Monee, Ill. 60449

[73] Assignee: William B. Griesinger, Monee, Ill.

[21] Appl. No.: 195,656

[22] Filed: Aug. 17, 1988

[51] Int. Cl.⁴ .............................................. B62B 1/14
[52] U.S. Cl. .............................. 280/79.4; 280/47.131; 414/428
[58] Field of Search ..................... 280/47.13 R, 47.11, 280/63, 79.1 R, 79.1 A, 47.131, 79.11, 79.4; 414/427, 428, 426

[56] References Cited

U.S. PATENT DOCUMENTS

| | | | |
|---|---|---|---|
| 2,207,443 | 7/1940 | Schneider | 414/428 |
| 2,543,276 | 2/1951 | Buechler | 414/428 |
| 2,545,440 | 3/1951 | Barber | 414/427 |
| 2,640,615 | 6/1953 | Wedel | 414/428 |
| 3,378,154 | 4/1968 | Mousel | 414/428 |
| 3,463,337 | 8/1969 | Reznicek | 414/428 |
| 3,828,955 | 8/1974 | Harkey | 414/428 |

FOREIGN PATENT DOCUMENTS

| | | | |
|---|---|---|---|
| 173347 | 12/1952 | Austria | 414/428 |
| 1154659 | 4/1958 | France | 414/426 |

Primary Examiner—Charles A. Marmor
Assistant Examiner—Tamara L. Finlay

[57] ABSTRACT

A wheel mounting device of fork-like design, adapted to lift and position a wheel by means of two horizontal parallel rollers, two vertical parallel rollers, a mainframe plate with caster assemblies mounted thereunder, and extensions forming a triangle, with a foot plate being mounted at the apex of the triangle, and said foot plate being on the same horizontal plane as the mainframe plate and the horizontal rollers.

1 Claim, 5 Drawing Sheets

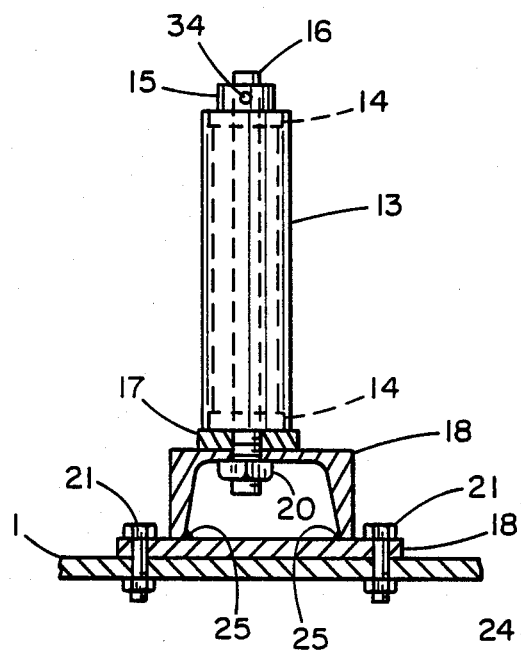
FIG. 4
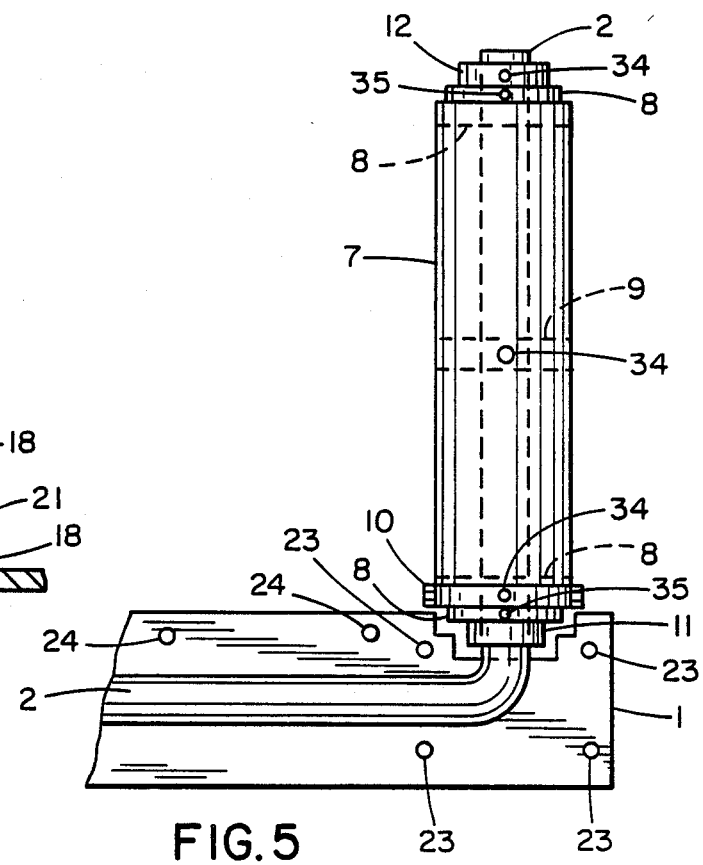
FIG. 5
FIG. 7
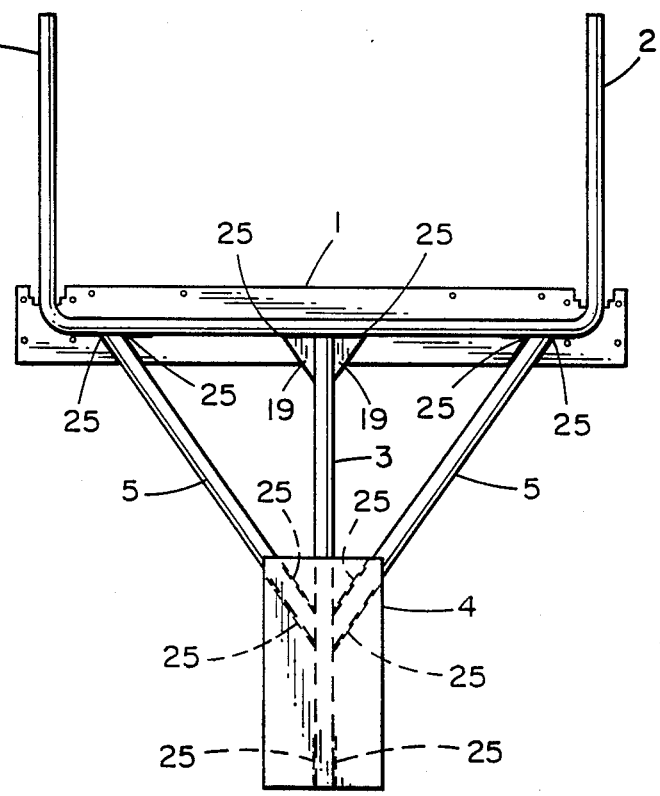
FIG. 6
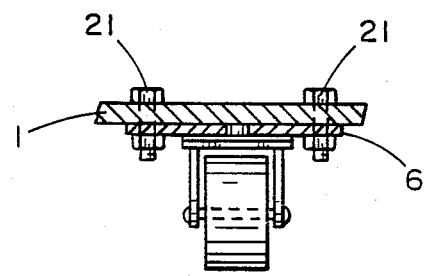

TRUCK TIRE MOUNTING DEVICE

FIELD OF INVENTION

This invention relates to tire changing tools, and more specifically, to a device for the mounting and removal of wheels of heavy trucks and buses. Since many of these vehicles today use wheels where the rim and wheel are one integrated piece of formed steel, with the added weight of the tire, it makes it extremely difficult for a single person to mount a wheel on a hub of such a vehicle.

DISCUSSION OF PRIOR ART

Although various tools for lifting and positioning of tires relative to their being mounted on the hub of a vehicle have been patented such as, U.S. Pat. Nos. 2,207,443 to Schneider, 3,378,154 to Mousel, 3,828,955 to Harkey, they are all at a distinct disadvantage as they are too structurally small and of inadequate design to position and mount the very heavy truck and bus wheels of today's modern vehicles.

The above mentioned patents all have the same basic principal of having a hand-operated handle to create a fulcrom action for positioning a tire prior tomounting on a hub, leaving only one hand free to align the studs with the holes in the wheel. This process is very inadequate when mounting large truck and bus wheels, as the shear weight and bulk of these wheels mandates both hands must be used to rotate and align the studs of the hub with the holes in the wheel.

Some buses, and all trailer-tractors have freely rotating front wheels, because of the absence of a braking system being installed on them. The traditional way of mounting such wheels is with the operator positioned on his right knee, with his left foot extended to the left-hand side of the tire, with his left hand gripping the left-hand side of the tire, and his right hand lifting the tire by means of a tire iron (a round steel bar, with a flat portion at one end) inserted under the tire, thus the operator is lifting the dead weight of the wheel with one hand. If there is the slightest misalignment of the studs on the hub with the holes in the wheel, the hub rotates out of alignment and the wheel must be lowered to the floor and realigned with the studs, as there is no way the wheel can be rotated in a raised position by means of a tire iron. As can be seen, this procedure is very physically demanding and hazardous to the operator.

SUMMARY OF THE INVENTION

It is the primary objective of this invention to provide a truck wheel mounting device of sturdy and portable design to raise and position a wheel in an effortless way to acquire accurate alignment between a hub and the wheel parts so as to overcome the physically demanding and hazardous procedure previously discussed in (Prior Arts).

A further objective of this invention is to provide a device to raise a wheel to a mounting position relative to hub by means of the operator's own balanced body weight being applied to a foot plate of the device.

A further objective of this invention is to provide a device of fork-like design which allows the tire to be lifted from the floor by simply tilting and rolling the device forward to fit underneath the tire, the horizontal rollers and vertical rollers engaging the tire in a balanced and equal position for mounting, thus eliminating any manual lifting or positioning of the wheel onto the device by the operator.

A further objective of this invention is to provide a device with two horizontal rollers on which the wheel is lifted, carried and rotated.

A further objective of this invention is to provide a device with two vertical rollers which engage the sidewalls of the tire and hold the wheel in an upright position, thus leaving both hands of the operator free to rotate and align the wheel. Another objective of the invention is to provide a device where the wheel changing procedure is performed in a stand-up position, eliminating any bending or kneeling.

The present invention is characterized as being of fork-like in design with two horizontal rollers for lifting, carrying and rotating a wheel, aided by two vertical rollers which support the wheel in an upright position. The roller assemblies being supported by a flat, rectangular metal plate which has caster assemblies mounted at opposite ends of the plate, to give the device mobility. There are also extensions, extending from the back of the plate forming a triangular structure upon which a foot plate is mounted at the extended end.

The above stated objectives and advantages of the invention will become apparent from the following detailed description of the invention.

BRIEF DESCRIPTIONS OF THE DRAWINGS

In the drawings, like reference characters designate similar parts in the different views.

FIG. 1 Top overall view of device

FIG. 2 Side view elevation of device

FIG. 3 Front view elevation of device

FIG. 4 Broken perspective of vertical roller support assembly.

FIG. 5 Detailed breakdown of horizontal pickup roller assembly

FIG. 6 Broken perspective of swivel caster mounting assembly.

FIG. 7 Detailed breakdown of main frame without components.

FIG. 8 Top view of device with tire mounted

FIG. 9 Side elevation view of the device with a wheel poitioned on it in a raised position FIG. 10 Side view of device positioned under tire prior to lifting FIG. 11 Side view of device with wheel in raised position ready to be mounted to a hub assembly FIG. 12 Oblique view of device

DETAILED DESCRIPTION OF INVENTION

Figure 1:
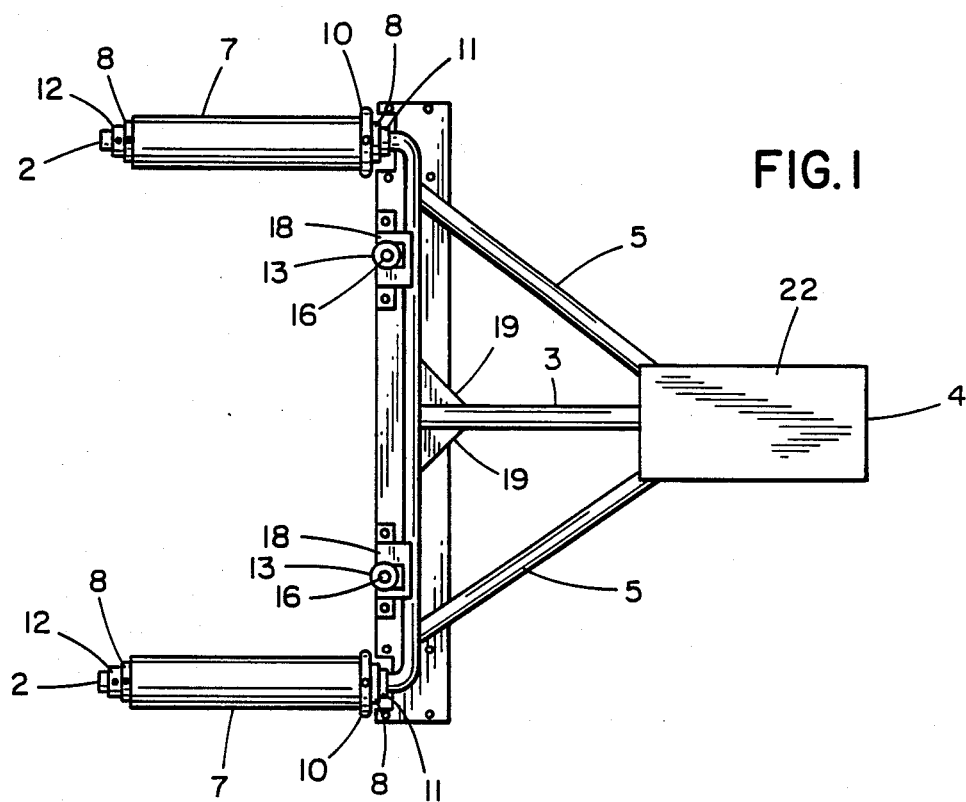
Figure 2:
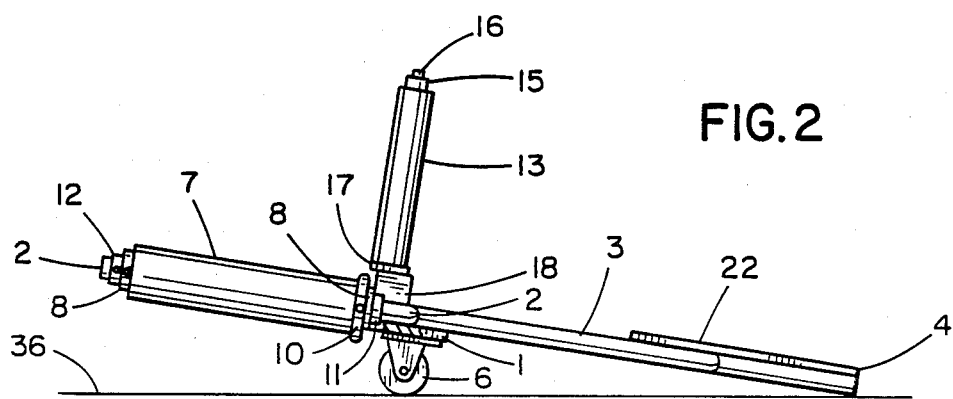
Figure 3:
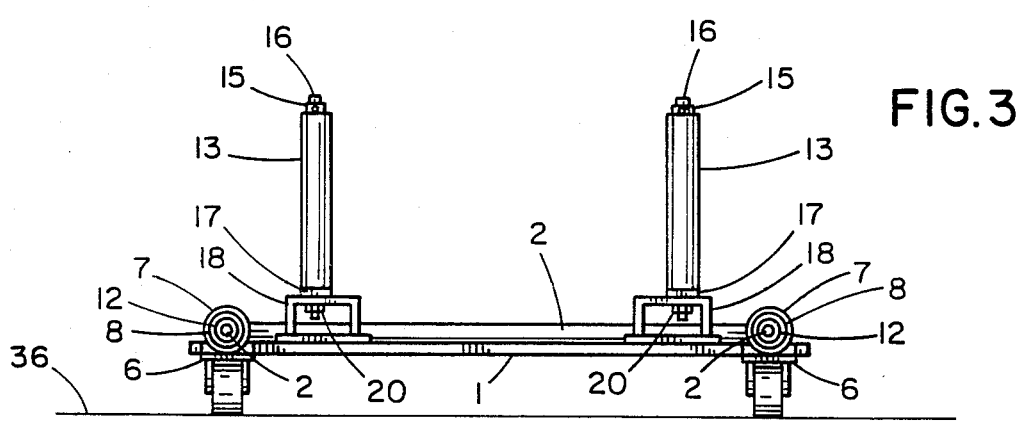

With reference to FIG. 5 and 7, we see the rectangular flat heavy metal plate 1. with two recessed portions at opposite ends of the plate, to accept the position of the pickup rollers FIG. 5. The plate being of predetermined length comprises the main supporting member of the device, all components of the device receiving support by means of welds 25, or being secured to the plate by Bolts 21. A U-shaped solid metal round Bar 2 is welded longitudinally in a centered position on the top of the main-frame plate 1, the extensions of which serve as axle shafts for the pickup rollers 7. Also welded to the main-frame Plate 1 at the center, and extending back laterally, is the foot activated Lever 3, which is a solid metal round bar being reinforced at the junction of the main-frame Plate 1 with two similar triangular heavy, metal Plates 19. The Plates 19. are welded 25. to the main-frame plate 1, the U-shaped pickup shaft 2, and the foot activated lever 3. thereby forming a very strong bond between the main frame plate 1 and the foot-activated lever 3. The foot-activated lever 3 is supported at the extended end by two similar solid metal, round reinforcing bars 5, both being welded to the extended end of the foot-activated lever 3 and extending to opposite ends of the main-frame plate 1, where they are welded 25 to the main-frame plate 1, and to the U-shaped pickup shaft 2. upon the triangular structure, thus formed, and where the two reinforcing bars 5 and the foot-activated lever 3 form a junction, a flat, rectangular, metal foot-plate 4 is welded. The foot-plate 4 has a non-skid surface 22 applied to it to prevent slippage between the operator's foot 33 and the surface of the foot plate 4. This is clearly visible in FIG. 10 and FIG. 11.

Figure 8:
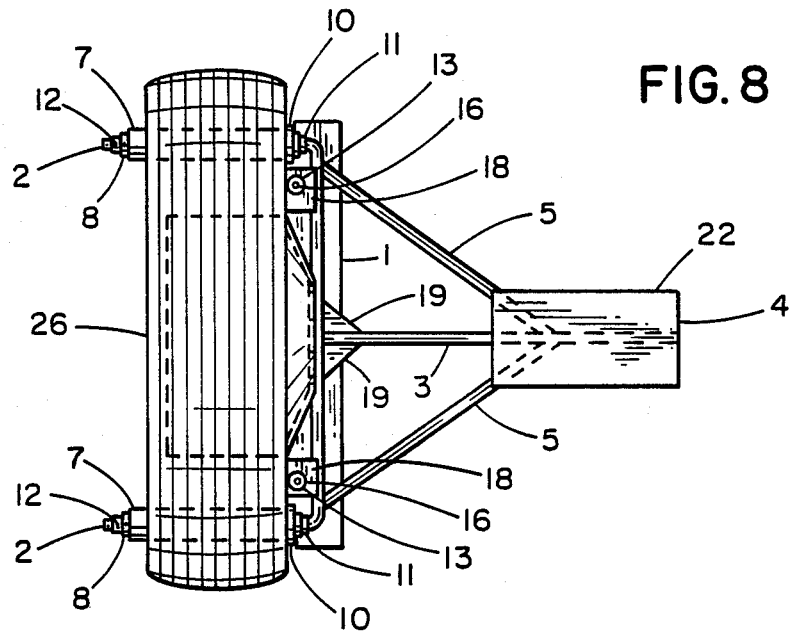
Figure 9:
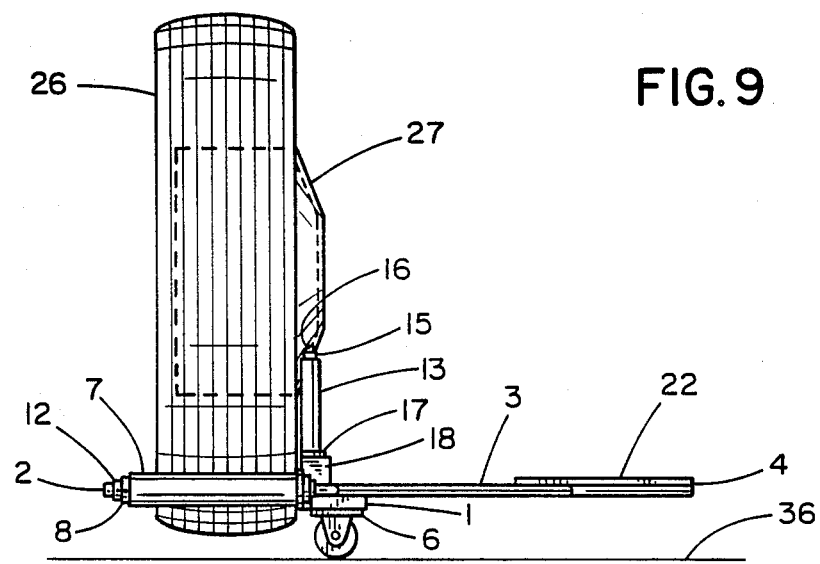

The purpose of the pickup rollers 7 becomes quite obvious when we view FIG. 8 and 9. The two similar pickup rollers 7 purpose being to lift and carry, and rotate the wheel in the mounting and removal procedure, relative to the wheel being mounted on a hub. In FIG. 8 we see the pickup rollers 7 as viewed from the top, inserted under the tire 26. In FIG. 9. in a left-hand view of the device can be seen the raised position of the pickup rollers 7 with the tire positioned upon them.

On FIG. 5 the detailed breakdown of the pickup roller 7 assembly shows the metal roller 7 with two identical bearings 8 press fitted into each end of the tube 7, with set screws 34 threaded through the collar 10 and the tube 7, secured onto the outer race of the bearing 8, thus making the pickup tube 7 rotate on the bearing 8 in a positive manner. The bearings 8 are so constructed they have small extended flanges fitted with a set screw 35, that are locked on to the pickup shaft 2. The pickup roller 7 is locked in position on the pickup shaft 2, by a locking collar 12, with a set screw 34, locked to the pickup shaft 2, at the extended end of the pickup shaft 2. There is also a brass spacer 11, at the curvature of the pickup shaft 2, to properly position the pickup roller 7, and to keep it from binding. Centered on the pickup shaft 2, is a solid support bushing 9, which is locked on to the pickup shaft 2, with a set screw 34. The purpose of which is to prevent any distortion of the pickup roller 7.

On FIG. 8 and 9, can be clearly seen. The function of the vertical support rollers 13, which is to hold and stabilize the wheel when it is positioned on the pickup rollers 7. FIG. 8 is shown as a view from the top, with the tire 26, positioned on the pickup rollers 7, with the vertical support rollers 13 supporting the sidewalls of the tire 26. FIG. 9 is a side view of the device with a wheel positioned on the pickup rollers 7 and the vertical support rollers 13, supporting the sidewalls of the tire 26, and holding it in a upright position. On FIG. 4, is the broken perspective view of the vertical support roller 13 consisting of a heavy metal tube with press fitted identical bearings 14, at both ends of the tube. The vertical support roller 13, rotates on a solid metal shaft 16, and is locked in place on the top of the shaft 16, with a locking collar 15, secured to the shaft 16 by a set screw 34. The thread bottom of the shaft 16 is threaded thru a threaded locking plate 17. The shaft 16 then extends thru a off-center bored hole in the vertical support roller bracket 18, and is secured on the bottom of the vertical support roller bracket 18 by a threaded nut 20. The vertical support roller bracket 18 is constructed of channel iron, with a flat metal rectangular plate welded 25 to the extended members of the channel iron, thus forming a mounting plate, in which two holes are bored, aligned with two holes in the main-frame plate 1, to accept two mounting bolts 21, to secure the vertical support roller bracket 18, to the main-frame plate 1. Because of the close proximity of the vertical support roller bracket 18, to the U shaped pickup shaft 2, welded to the main-frame plate 1, the vertical support roller bracket 18, is recessed at the bottom, thus the vertical support roller bracket 18 extends partially over the U shaped pickup shaft 2. This can be seen in a better perspective by referring to FIG. 1. The purpose of the off-center bored holes in the vertical support roller brackets 18 is to obtain the proper positioning of the vertical support rollers 13 against the sidewalls of the tire 26, to be mounted. This can viewed in detail on FIG. 8. Also, on FIG. 5. can be viewed the position of the two mounting holes 24, for the vertical support roller bracket 18.

Also on FIG. 6. is the broken perspective of the metal swivel caster assemblies 6. Their function being to allow the operator to roll and position the device correctly in the wheel mounting and removal procedure. There are two swivel caster assemblies 6, mounted under the main-frame plate 1, at opposite ends of the plate, directly under the curvature of the U shaped pickup shaft 2, thus giving the device the best stability available. The casters 6, are secured to the main frame plate 1, by bolts 21, holes being bored in the main-frame plate 1, aligned with the holes in the caster assemblies 6. The position of the four mounting holes 23 in the main-frame plate 1 being clearly visible in FIG. 5.

Figure 10:
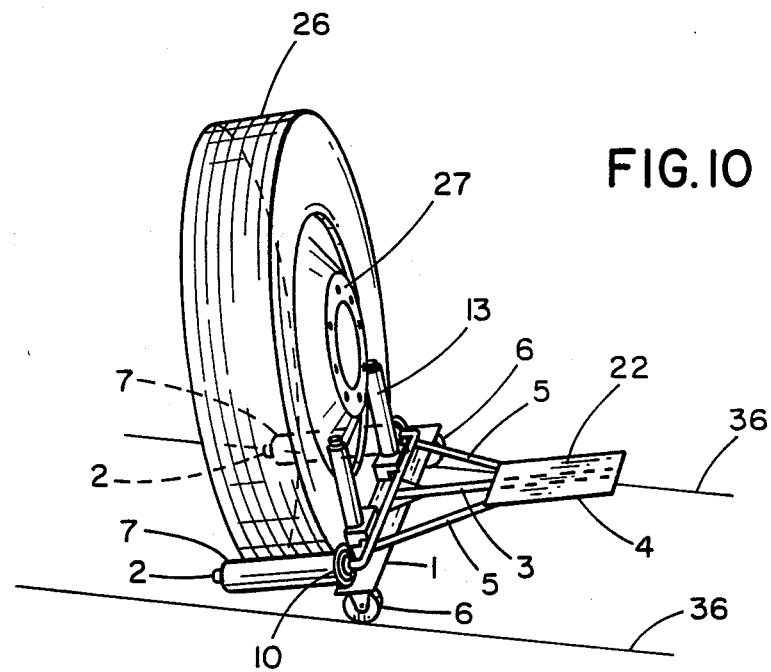
Figure 11:
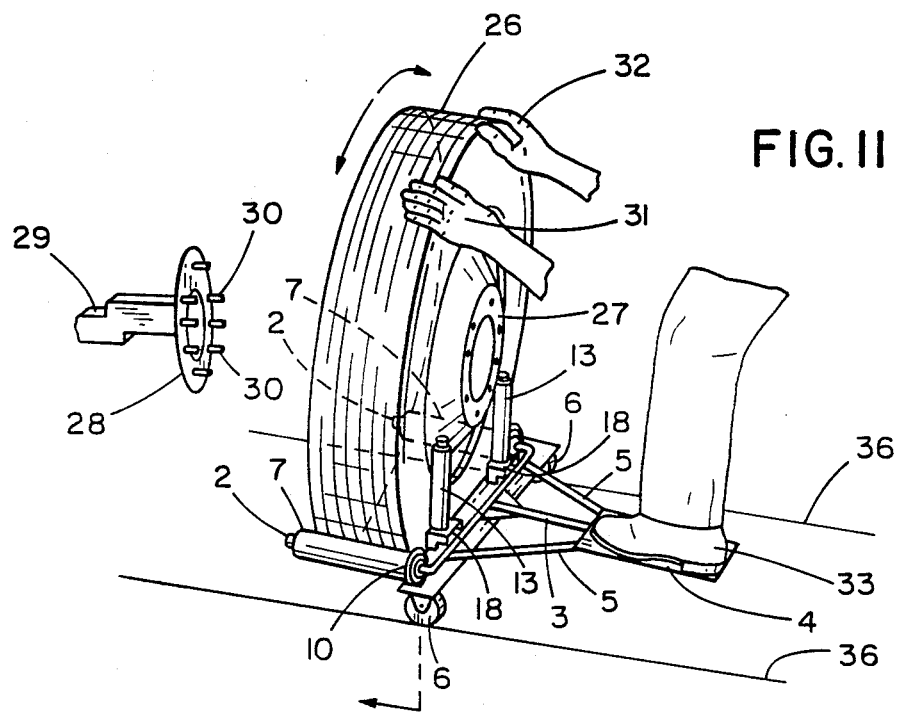
Figure 12:
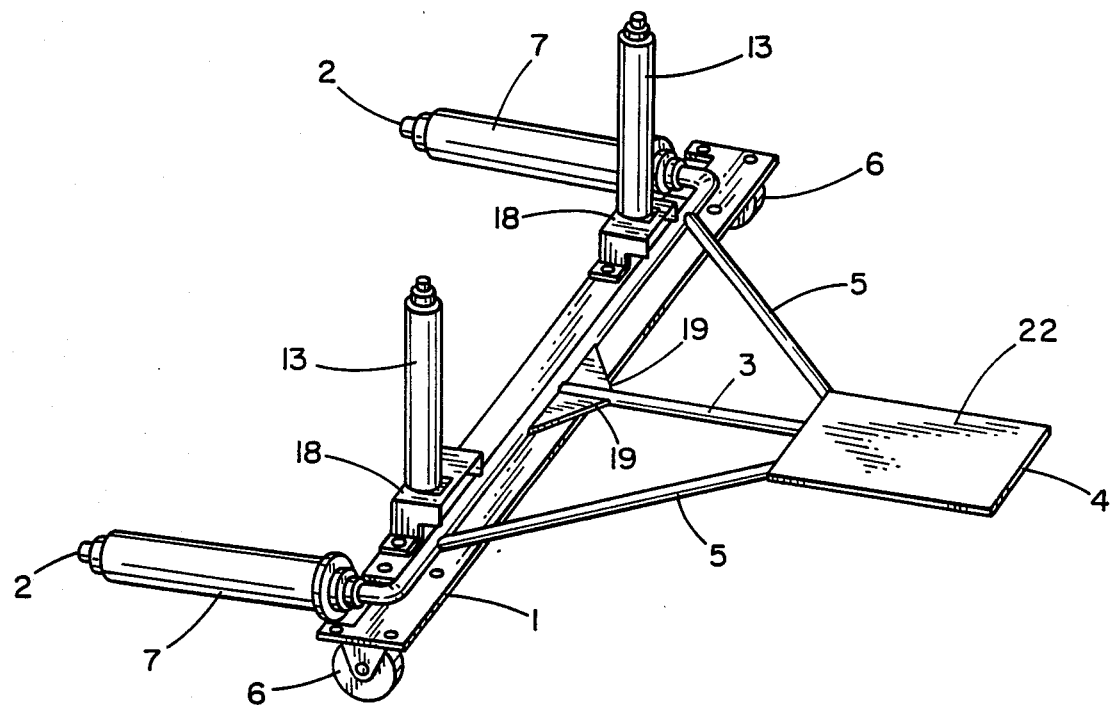

The wheel mounting operation starts with the wheel being leaned against the vehicle adjacent to the hub, so the pickup rollers 7 can be easily positioned underneath the tire 26 as viewed on FIG. 10. The device is rolled forward into position by means of the swivel caster assemblies 6, thus making even contact on the outer radius of the tire 26 with the pickup rollers 7 with the vertical support rollers 13 simultaneously engaging the sidewalls of the tire 26. The operator then places both hands, 31 and 32 FIG. 11 on the tire 26 stepping down with his foot 33, on the footplate 4 causing a lever type action with the caster assemblies 6, as the fulcrum, the tire 26 is easily raised from the ground 36. As the operators one foot 33 engages the footplate 4, his other foot, (not shown), is positioned firmly on the ground, with his legs being in a slightly open stance. Using both of his hands, 31 and 32, and his foot 33, the operator simply pushes the device toward the hub 28 located on the axle 29, at the same time rotating the tire 26 on the pickup rollers 7 and the vertical support rollers 13 to align the wheel holes 27 with the studs 30 on the hub 28. When the studs 30 are aligned with the wheel holes 27, he mounts the tire 26 on the hub 28, by simply pushing it forward.

To dismount a wheel, simply jack wheel off ground, remove nuts from studs 30, roll device underneath the tire 26 and push foot plate 4 down, causing wheel to rise, then roll the device in a backward motion away from hub 28.

The overall sturdy construction and portable design allows the device to be used in a shop area, or in an "on the road" situation. In a "on the road" situation, if the surface of the ground is stony or otherwise impedes the action of the caster assemblies, a metal support plate is inserted under the tire, to aid the mobility of the caster assemblies.

I claim:

1. A truck wheel mounting device comprising:
   a laterally extending main-frame plate supported by each end by a caster assembly;
   two horizontally protruding parallel roller assemblies, each one of which extends forwardly from each end of said main-frame plate;
   two vertical parallel roller assemblies extending normal to said main-frame plate;
   a horizontal foot activated lever extending rearwardly from the main-frame plate;
   a first reinforcing bar having one end connected to a first end of said main-frame plate and the other end connected to said foot activated lever to define an apex;
   a second reinforcing bar having one end connected to a second end of said main-frame plate and the other end connected to said foot activated lever at said apex;
   a foot plate mounted at said apex;
   and the length of said foot activated lever is relatively longer than the height of said caster assemblies thereby forming a lever action by pushing the foot plate down and raising the horizontal roller assemblies with the caster assemblies comprising a fulcrom point.

* * * * *